United States Patent [19]
Golley et al.

[11] Patent Number: 6,140,376
[45] Date of Patent: *Oct. 31, 2000

[54] DISPERSED AQUEOUS SUSPENSIONS

[75] Inventors: Christopher Robin Langdon Golley, Sandersville, Ga.; David James Mogridge, Plymouth, United Kingdom; David Robert Skuse, Truro, United Kingdom; Deborah Susan Thrale, St Austell, United Kingdom

[73] Assignee: Imerys Minerals, Ltd., United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 08/996,549

[22] Filed: Dec. 23, 1997

[30] Foreign Application Priority Data

Dec. 27, 1996 [GB] United Kingdom ............... 9627002

[51] Int. Cl.[7] ................. B01F 3/12; C09C 1/02
[52] U.S. Cl. .............. 516/78; 516/100; 106/463; 106/464
[58] Field of Search ............. 252/313.1; 106/400, 106/463, 464; 516/78, 79, 100

[56] References Cited

U.S. PATENT DOCUMENTS

| | | | |
|---|---|---|---|
| 3,989,195 | 11/1976 | Falcon-Steward | 241/16 |
| 4,159,312 | 6/1979 | Shibazaki et al. | 423/268 |
| 4,175,066 | 11/1979 | Shibazaki et al. | 428/511 |
| 4,242,318 | 12/1980 | Brahm et al. | 106/464 |
| 4,818,783 | 4/1989 | Shioji et al. | 524/425 |
| 5,181,662 | 1/1993 | Bousquet et al. | 106/465 |
| 5,292,365 | 3/1994 | Delfosse | 106/464 |
| 5,531,821 | 7/1996 | Wu | 106/464 |
| 5,533,679 | 7/1996 | Golly | 241/17 |
| 5,584,923 | 12/1996 | Wu | 106/464 |

FOREIGN PATENT DOCUMENTS

| | | |
|---|---|---|
| 0 000 415 | 1/1979 | European Pat. Off. . |
| 0 380 430 | 8/1990 | European Pat. Off. . |
| 614948A1 | 9/1994 | European Pat. Off. . |
| 60-28818 | 2/1985 | Japan . |
| 1414964 | 11/1975 | United Kingdom . |
| 1472701 | 5/1977 | United Kingdom . |
| 1585448 | 3/1981 | United Kingdom . |

OTHER PUBLICATIONS

Derwent Abstract 85–077232/13 and JP600028818A Lion, Derwent week 8513.

*Primary Examiner*—Richard D. Lovering
*Assistant Examiner*—Daniel S. Metzmaier
*Attorney, Agent, or Firm*—Finnegan, Henderson, Farabow, Garrett & Dunner, L.L.P.

[57] ABSTRACT

A method of producing a dispersed aqueous suspension of an inorganic particulate material which includes the steps of (a) preparing an aqueous suspension of calcium carbonate particles having a particle size distribution such that at least 35% by weight have an esd less than 24 μm, the solids concentration of the suspension being no more than 40% by dry weight; (b) concentrating the suspension by dewatering to increase the solids content to at least 60% by dry weight; and (c) adding a dispersing agent to the concentrated suspension to disperse the calcium carbonate particles and characterized in that the suspension produced by step (c) is pumpable and flowable, the dispersing agent comprising a water soluble copolymer of acrylic acid and maleic acid or a salt thereof having a molar ratio of acrylic acid units to maleic acid units of from 0.5:1 to 10:1 and a mass average molecular mass of from 1,000 to 100,000.

11 Claims, 4 Drawing Sheets

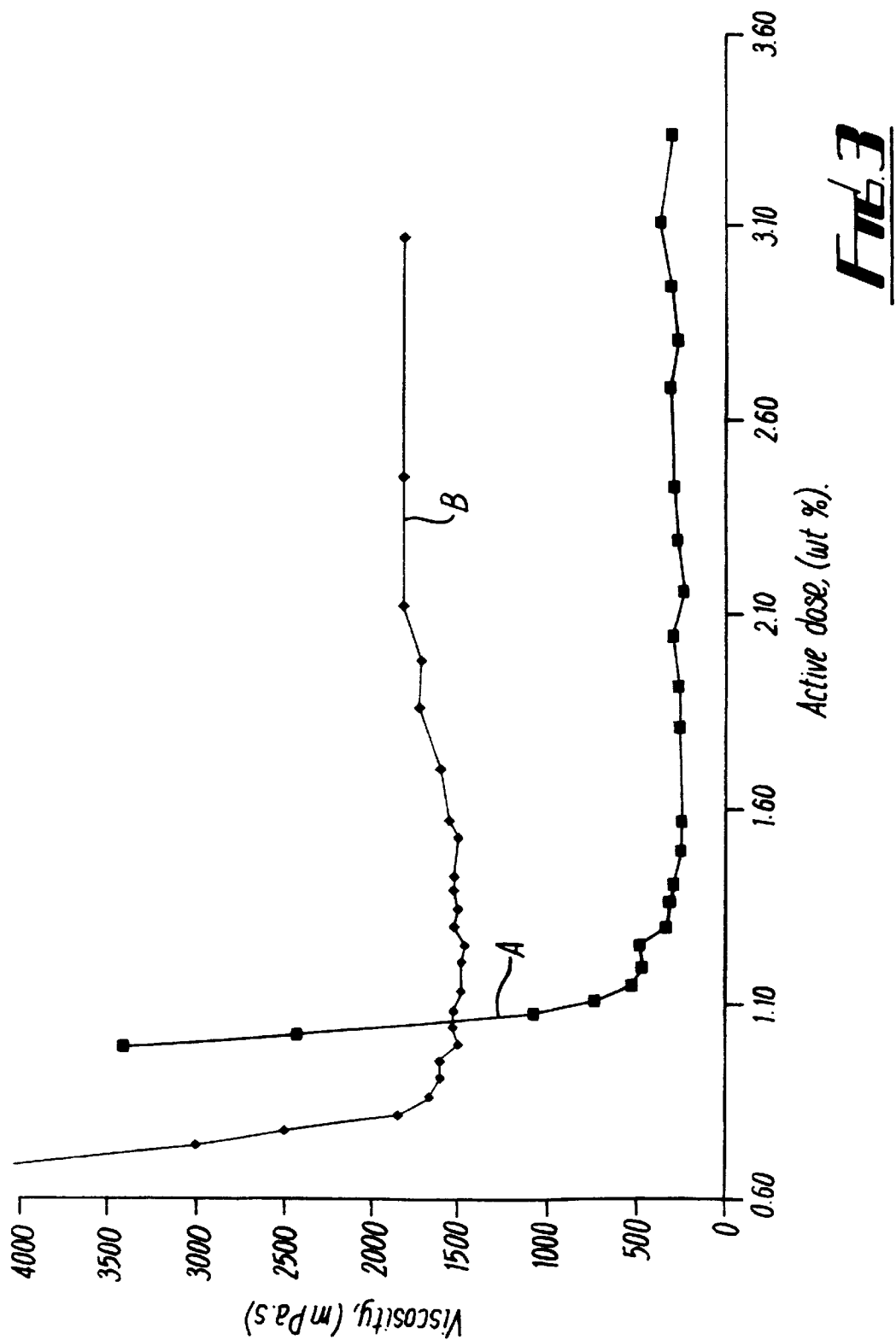

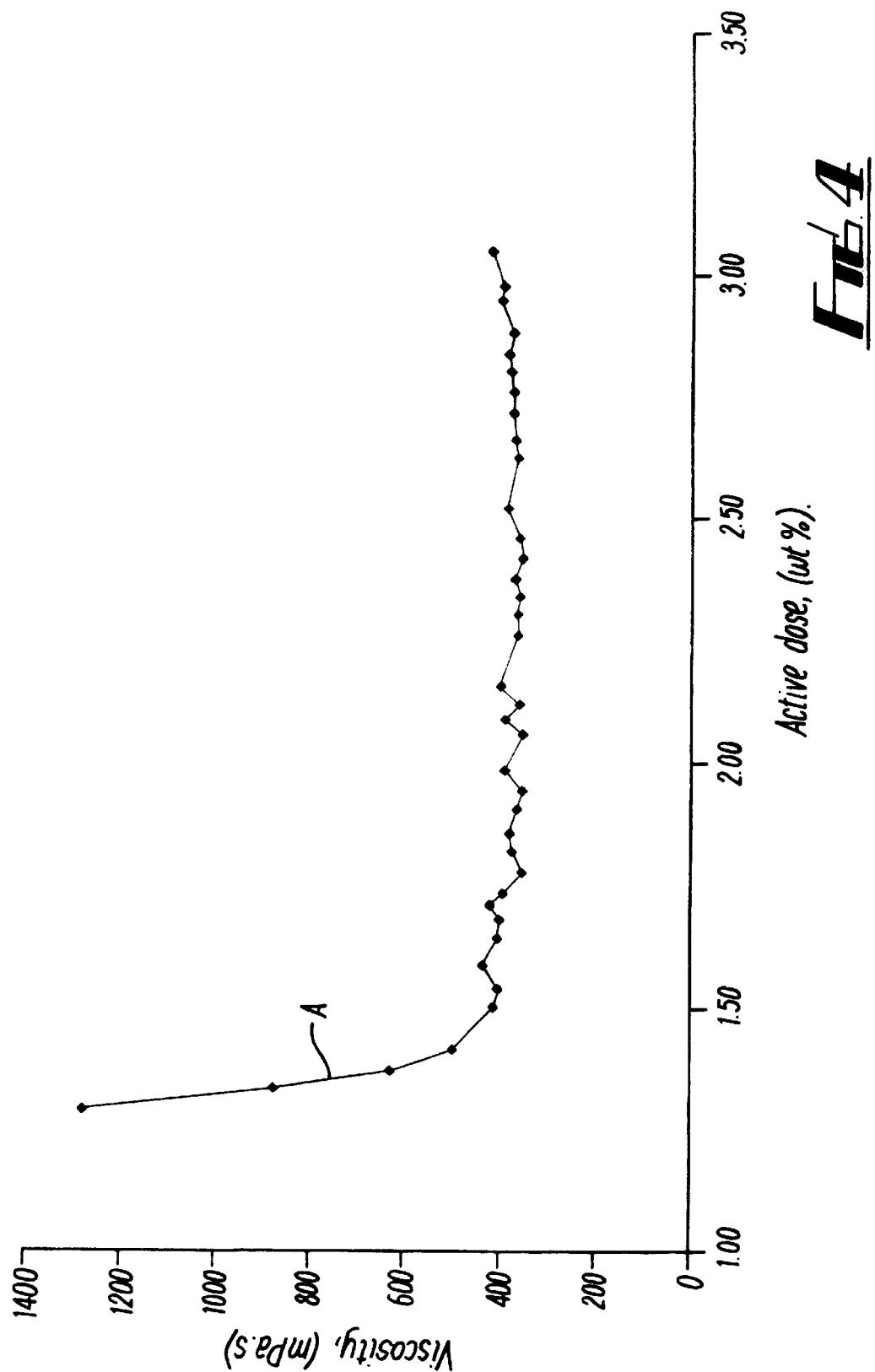

DISPERSED AQUEOUS SUSPENSIONS

BACKGROUND OF THE INVENTION

The present invention relates to dispersed aqueous suspensions. In particular, it relates to dispersed aqueous suspensions of inorganic particulate material and to the production of such suspensions.

Aqueous suspensions of inorganic particulate material, eg. comprising calcium carbonate or kaolin are used widely in a number of applications, eg. to produce pigment or filler containing compositions which may be used in paper manufacture or paper coating or in the production of filled compositions for paints, plastics and the like. Where such suspensions are required in a high solids form it is necessary to disperse the particulate material using a dispersing agent. In many cases, the dispersing agent limits one or more of the properties of the product, eg. its viscosity, its solids concentration or its particle size distribution. The amount of dispersing agent used may need to be limited by a user on cost grounds.

Sodium polyacrylate is the most widely used dispersing agent for inorganic particulate materials such as calcium carbonate. However, in some situations, use of sodium polyacrylate is not ideal. For instance in certain applications requiring high solids concentrations as described hereinafter required dose rates of sodium polyacrylate are too high and therefore too costly, the product viscosities obtained upon dispersion and after a period of time, eg. at least 24 hours, are too high and the suspension solids level has to be reduced to an unacceptably low level to compensate.

SUMMARY OF THE INVENTION

According to the present invention in a first aspect there is provided a method of producing a dispersed aqueous suspension of an inorganic particulate material which includes the steps of (a) preparing an aqueous suspension of calcium carbonate particles having a particle size distribution such that at least 35% by weight have an esd less than 2 $\mu$m, the solids concentration of the suspension being no more than 40% by dry weight; (b) concentrating the suspension by dewatering to increase the solids content to at least 60% by dry weight; and (c) adding a dispersing agent to the concentrated suspension to disperse the particles of the inorganic particulate material and characterised in that the suspension produced by step (c) is pumpable and flowable, the dispersing agent comprising a water soluble copolymer of acrylic acid and maleic acid or a salt thereof having a molar ratio of acrylic acid units to maleic acid units of from 0.5:1 to 10:1 and a mass average molecular mass of from 1,000 to 100,000, preferably from 1,000 to 10,000.

DESCRIPTION OF THE INVENTION

The inorganic particulate material employed in the method according to the invention may comprise calcium carbonate and/or kaolin.

By 'esd' is meant the particle equivalent spherical diameter as measured by the well known technique of sedimentation.

Preferably, the viscosity of the suspension is between 100 mPa.s and 600 mPa.s especially between 200 mPa.s and 500 mPa.s on formation.

In this specification, all suspension viscositites refer to measurement at ambient temperature (22° C.) using a Brookfield Viscometer set to operate at a spindle speed of 100 rpm. We employed the following procedure in the measurement of viscosities of suspension samples. The suspension was thoroughly mixed using a homogeniser. Immediately after homogenisation the suspension was transferred to the viscometer. The viscometer spindle was immersed in the suspension. The viscometer spindle was activated 30 seconds after cessation of homogenisation and the viscosity was recorded a further 15 sec later.

The method according to the first aspect may be one wherein the viscosity of the suspension produced in step (c) if alternatively dispersed with a polyacrylic acid having the same molecular mass and the same degree of neutralisation as the said copolymer of acrylic acid and maleic acid instead of the said copolymer has a viscosity which is greater than 1,000 mPa.s.

The said dispersing agent may comprise a partially or wholly neutralised salt of the said copolymer. Such a salt may comprise for example an alkali metal salt, eg. a sodium salt, or an ammonium salt of the copolymer of acrylic and maleic acids. Desirably the molecular mass is in the range 1,000 to 30,000 especially 1,500 to 10,000, eg. 2,000 to 8,000 on a mass average basis.

Steps (a) and (b) may be carried out to produce or process the said calcium carbonate particles in a known manner. Examples of processes using such steps and beneficially embodying the invention are as follows.

Where the said inorganic particulate material comprise calcium carbonate and/or kaolin the particles of the material may be particles which have been ground, eg. using in a known grinding procedure, an attrition grinding medium such as silica, alumina or zirconia, in an aqueous suspension having a low solids concentration, eg. less than 35% by weight. Thus, the product of step (a) in the method according to the present invention may be the product of such attrition grinding.

Step (b) may be carried out to concentrate the suspension to facilitate storage and transport of the suspension product or to use the same in a high solids application, eg. as a pigment, filler or extender composition for use in paper making, paper coating or in plastics or paints composition.

In processes of this kind it is conventional to avoid use of a dispersing agent in the dewatering step because concentration is carried out with the particulate solids in a flocculated state. Thus, after dewatering the concentrated inorganic particulate material obtained, eg. a high solids filter cake, may comprise a flocculated body whose constituent particles require redispersion. As exemplified hereinafter, the redispersion may beneficially be carried out using the method according to the first aspect of the invention.

The inorganic particulate material may alternatively comprise precipitated calcium carbonate (pcc) produced in a known way by a chemical precipitation reaction low solids aqueous suspension, eg. having a solids concentration less than 25% by weight. The particles may be predominantly of a preferred crystal form; eg. scalenohedral, rhombohedral or aragonite, obtained by applying known reaction conditions which favour the growth of crystals of the preferred form. The particles may be the product of reaction of gaseous carbon dioxide with calcium hydroxide in a slaked lime suspension in a manner well known to those skilled in the art. Dewatering of the dilute precipitate-containing suspension produces a concentrated solid, eg. filter cake, similar to the concentrated solid material produced by grinding as described hereinbefore. The concentrated solid may beneficially be redispersed in accordance with the present invention as exemplified hereinafter. Such a dispersed, concentrated suspension may be used in compositions for the applications described hereinbefore.

The particle size distribution (PSD) of the product obtained may be selectively steep, eg. the percentage of particles less than a given value plotted against the logarithm of the particle size may show an inverted 's'-shaped region as will be familiar to those skilled in the art, eg. as described in U.S. Pat No. 5,292,365. For example, the PSD steepness factor which may be defined as particle diameter in $\mu$m at 50% by weight÷particle diameter in $\mu$m at 20% by weight as obtained from the PSD curve, may be less than 2.0, eg. less than 1.7.

Although it is desirable to achieve by use of the method according to the first aspect of the present invention a pumpable, flowable slurry, eg. having a dry solids content of at least 60% by weight, it is also desirable for the resultant slurry not to be excessively fluid. In storage and transport of such excessively fluid slurries it is necessary to include a suspension aid, eg. an alginate, in the slurry to prevent unwanted sedimentation. The viscosity of the slurry product therefore is desirably in the range of from 100 mPa.s to 500 mPa.s, especially 200 mPa.s to 400 mPa.s, to avoid use of the suspension aid which adds to the cost of the slurry. The slurry may be obtained in the desired viscosity range either by (i) blending an acrylic acid/maleic acid copolymer individually giving a very fluid slurry, eg. having a viscosity less than 100 mPa.s, with an alternative dispersing agent, eg. a water soluble polyacrylic acid or a salt thereof, individually giving a higher viscosity, eg. greater than 1000 mPa.s under similar conditions or (ii) using an acrylic acid/maleic acid copolymer or salt thereof having an acrylic:maleic molar ratio selected to give the required viscosity. For example, where a sodium salt of a copolymer of acrylic and maleic acids having a molar acrylic to maleic ratio of 2:1 gives a slurry viscosity of less than 100 mPa.s it may be suitable to use as dispersing agent a sodium salt of an acrylic acid/ maleic acid copolymer having a molar acrylic to maleic ratio of from 3:1 to 9:1, especially 5:1 to 7:1, to give the required slurry viscosity of 100 mPa.s to 500 mPa.s, especially 200 mPa.s to 400 mPa.s.

In the method according to the first aspect of the present invention the dewatering step may be carried out using a known procedure, eg. using filtration, eg. with a filter press of the tubular kind, evaporation, eg. forced evaporation under reduced pressure or centrifugation.

According to the present invention in a second aspect there is provided a dispersed aqueous suspension which is the product of the method according to the first aspect.

The suspension according to the second aspect may have a viscosity in the range 100 mPa.s to 500 mPa.s and desirably remains in that range after at least 24 hours after formation. The copolymer dispersing agent may be present in the suspension in an amount of from 0.1% to 2% by weight based upon the dry weight of the solids present in the suspension. The suspension may have a solids content of greater than 60% by dry weight, eg. greater than 70% by weight.

Copolymers of acrylic and maleic acids are known in the prior art. However, the benefits unexpectedly obtained by selection of such copolymers from the many known anionic water soluble dispersing agents for the particular task of dispersing inorganic particulate materials in a concentrated aqueous suspension following preparation and/or processing at low solids and subsequent concentration without dispersing agent is not known or suggested in the prior art.

Embodiments of the present invention will now be described by way of example with reference to the following Examples and the accompanying drawings, in which:

BRIEF DESCRIPTION OF THE DRAWINGS

FIGS. 1 to 4 are graphs of viscosity versus active dispersing agent dose for aqueous mineral suspensions treated in accordance respectively with an embodiment of the present invention and using a prior art procedure.

Curve A in each of FIGS. 1 to 4 represents use of a maleic/acrylic copolymer in accordance with an embodiment of the invention and Curve B in each case represents use of sodium polyacrylate in accordance with the prior art.

DESCRIPTION OF EMBODIMENTS OF THE INVENTION

EXAMPLE 1

Preparation of Steep PSD Ground Calcium Carbonate

Calcium carbonate was produced by grinding marble chips in an aqueous suspension at low solids (less than 25% by weight) using a grinding method as described in EP 614948.

No dispersing agent was present.

The particulate product had a particle size distribution such that at least 90% by weight of the particles had an esd of less than 2 $\mu$m. The product was concentrated to a solids concentration of 70% by weight using a filter press to form a flocculated, high solids filter cake. This was redispersed in water using two alternative dispersing agents A and B in varying doses. For each dispersed slurry so formed the values of $T_o$, $T_1$, and $T_{24}$ viscosity were measured in the manner described hereinbefore, where $T_o$, $T_1$ and $T_{24}$ viscosity is the viscosity of the suspension (a) immediately after preparation, (b) after standing for a period of 1 hour and (c) after standing for a period of 24 hours.

In these experiments dispersing agent A was the sodium salt of an acrylic/maleic acid copolymer having a 2:1 molar acrylic/maleic ratio and average molecular mass of 4000. Dispersing agent B was sodium polyacrylate (Dispex N40 supplied by Allied Colloids Ltd, Mw≅4,000).

Figure 1:
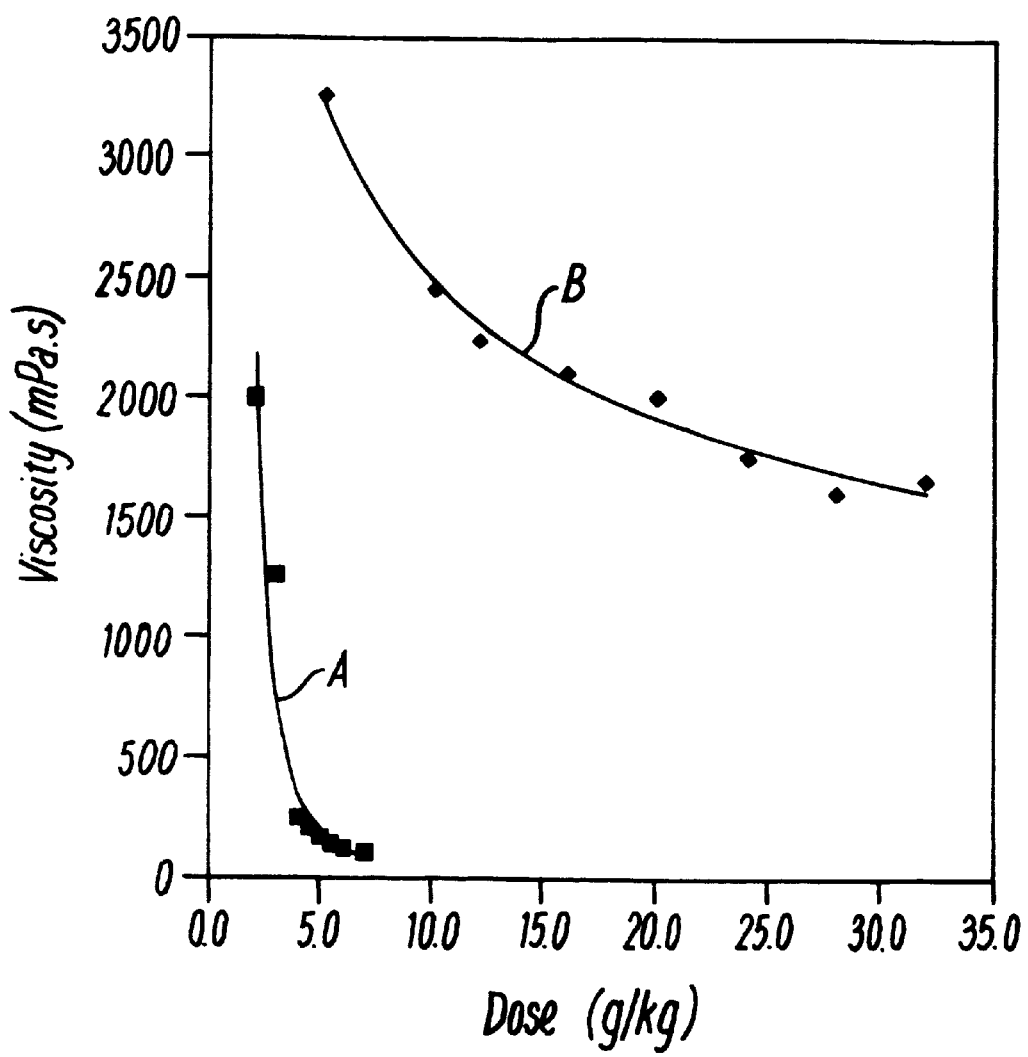
Figure 2:
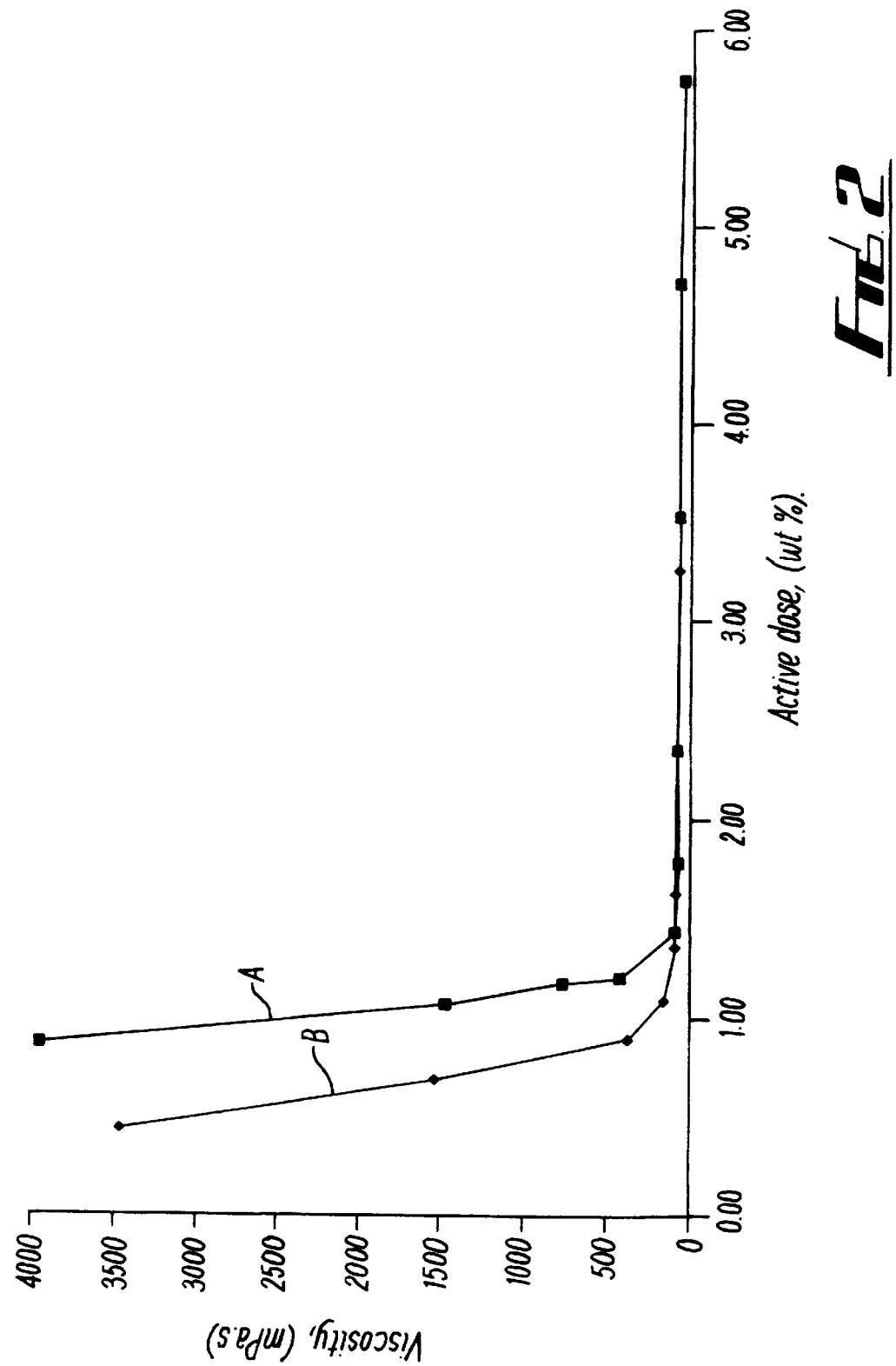

FIG. 1 shows a plot of initial $T_o$ viscosity versus active dispersing agent dose for the two dispersing agents. Curve A shows the plot for dispersing agent A and curve B shows the plot for dispersing agent B.

FIG. 1 shows that:
(i) for sodium polyacrylate (curve B) the initial viscosity ($T_0$) gradually dropped from 3250 mPa.s to 1600 mPa.s after a total addition of 28.0 g per kg of calcite;
(ii) for the acrylic/maleic copolymer (curve A) additions of 4.0 g per kg of calcite resulted in a reduction in $T_0$ viscosity from above 3000 mPa.s to 250 mPa.s. Further copolymer addition gave a minimum $T_0$ viscosity of 100 mPa.s (7.00 g per kg of calcite);
(iii) only small increases in viscosity with time were seen with both dispersing agents. However, the $T_1$ and $T_{24}$ viscosities observed with the acrylic/maleic copolymer were, of course, much lower than those with sodium polyacrylate.

The sharp fall in slurry viscosity at low levels on acrylic/ maleic copolymer addition to very low viscosity values and the small variance of this low viscosity throughout the remainder of the copolymer dose range illustrates that the acrylic/maleic copolymer has much greater efficacy for stabilising pre-ground calcite dispersions than sodium polyacrylate.

EXAMPLE 2

Pcc which was predominantly scalenohedral in crystal form was produced by bubbling carbon dioxide gas through a 2 m slaked lime suspension in a known manner. The solids concentration of the suspension was 20 weight %. The suspension was concentrated as in Example 1 to form a filter cake which was redispersed in water containing separately dispersing agents A and B as employed in Example 1. The solids concentrations of the suspensions formed, based on the dry weight of the pcc present, was in three separate experiments respectively 36.6%, 64.5% and 69%. The $T_o$ viscosity as a function of dispersing agent dose rate was measured for dispersing agents A and B at these three solids concentrations. The results obtained for the three suspension concentrations are plotted graphically in FIGS. 2 to 4 respectively where, in each case, curve A represents use of dispersing agent A and curve B represents use of dispersing agent B.

The results show the following:
(i) at a solids concentration of 36.6% (FIG. 2) dispersing agent A (curve A) shows no advantage over dispersing agent B (curve B);
(ii) a solids concentration of 64% (FIG. 3) suspensions using dispersing agent B (curve B) show unacceptably high viscosities whereas suspensions using dispersing agent A (curve A) show acceptable viscosities for active dose rates above about 1.10 weight %;
(iii) at a solids concentration of 69% weight acceptable viscosities are still obtained with dispersing agent A (curve A). Curve B does not appear in FIG. 4 because the measured viscosities are so high.

EXAMPLE 3

Ground calcium carbonate was produced having a particle size distribution such that about 60% had an esd less than 2 μm. The grinding was carried out by sand milling at a solids concentration of about 30 weight %. The suspension was dewatered using a rotary vacuum filter. The suspension was dispersed with a sodium polyacrylate dispersing agent as employed in Example 1. The viscosity was unacceptably high. The suspension was too viscous to process and to pump and was likely to set in transit.

The suspension obtained after dewatering was alternatively dispersed using copolymer dispersing agent A as used in Example 1. A minimum suspension viscosity of 60 mPa.s was obtained at an active dispersing agent dose rate of 0.4 weight %. Such a suspension is very fluid as discussed hereinbefore. The viscosity was raised to a more suitable value of about 300 mPa.s by addition of a viscosity raising agent, eg. an alginate or an alternative dispersing agent. A blend of dispersing agent A together with an alternative dispersing agent C which was a sodium salt of an acrylic/maleic copolymer having an acrylic:maleic molar ratio of 10:1, (mass average molecular mass=4,000) the blend containing agents A and C in the weight ratio 1:2 (A:C), was found to give a suitable viscosity at an active dispersing agent dose of 0.4% by weight.

The suspension obtained after dewatering was alternatively dispersed using only a further dispersing agent D which was the sodium salt of an acrylic/maleic copolymer having an acrylic to maleic ratio of 6:1 and a mass average molecular mass of 4,000 at an active dose amount of 0.4% by weight.

The suspensions obtained using dispersing agents A and C and separately D both showed the required viscosity of about 300 mPa.s.

What is claimed is:

1. A method of producing a dispersed aqueous suspension of calcium carbonate which includes the steps of (a) preparing an aqueous suspension of calcium carbonate particles having a particle size distribution such that at least 35% by weight have an esd less than 2 μm and which has a steepness factor of less than 2.0, wherein the steepness factor is defined as the particle diameter in pm at which there are 50% of the particles by weight divided by the particle diameter in pm at which there are 20% of the particles in weight, the solids concentration of the suspension being no more than 40% by dry weight; (b) concentrating the suspension by dewatering to increase the solids content to at least 64% by dry weight; and (c) adding a dispersing agent to the concentrated suspension to disperse the calcium carbonate particles and characterized in that the suspension produced by step (c) is pumpable and flowable, the dispersing agent comprising a water soluble copolymer of acrylic acid and maleic acid or a salt thereof having a molar ratio of acrylic acid units to maleic acid units of from 2.0:1 to 10:1 and a mass average molecular mass of from 1,000 to 100,000 and wherein the viscosity of the suspension is greater than or equal to 100 mPa.s and not greater than 600 mPa.s on formation and a solids content greater than 60% by dry weight.

2. A method as in claim 1 and wherein the steepness factor of the particle size distribution of the suspension of calcium carbonate particles is less than 1.7.

3. A method as in claim 1 and wherein the viscosity of the suspension is between 200 mPa.s and 400 mPa.s on formation.

4. A method as in claim 1, wherein the suspension produced in step (b) is such that if alternatively dispersed with a polyacrylic acid having the same molecular mass and the same degree of neutralization as said copolymer of acrylic acid and maleic acid instead of said copolymer of acrylic acid and maleic acid has a viscosity which is greater than 1,000 mPa.s.

5. A method as in claim 1 and wherein the calcium carbonate particles have been ground using an attrition grinding medium in an aqueous suspension having a solids concentration less than 35% by weight.

6. A method as in claim 1 and wherein in step (a) calcium carbonate comprises precipitated calcium carbonate (pcc) produced in a low solids aqueous suspension having a solids concentration less than 25% by weight.

7. A method as in claim 6 and wherein the calcium carbonate particles are predominantly a crystal form selected from the group consisting of scalenohedral, rhombohedral and aragonite.

8. A method as in claim 1 and wherein step (c) is carried out using a dispersing agent obtained by blending a first acrylic acid/maleic acid copolymer individually giving a fluid slurry having a viscosity less than 100 mPa.s, with an alternative dispersing agent, individually giving a higher viscosity greater than 100 mPa.s under similar conditions.

9. A method as in claim 8 and wherein said alternative acrylic acid/maleic acid copolymer has a higher acrylic acid molar content than said first acrylic acid/maleic acid copolymer.

10. A method as in claim 1 and wherein step (c) is carried out using as dispersing agent an acrylic acid/maleic acid copolymer or salt thereof having an acrylic:maleic molar ratio of from 2:1 to 5:1 to give a required slurry viscosity of 100 mPa.s to 500 mPa.s.

11. A method as in claim 1 and wherein step (c) is carried out using as dispersing agent an acrylic acid/maleic acid copolymer or salt thereof having an acrylic:maleic molar ratio of from 2:1 to 5:1 to give a required slurry viscosity of 200 mPa.s to 400 mPa.s.

* * * * *

UNITED STATES PATENT AND TRADEMARK OFFICE
CERTIFICATE OF CORRECTION

PATENT NO.    : 6,140,376
DATED         : October 31, 2000
INVENTOR(S)   : Christopher R.L. Golley et al.

Page 1 of 1

It is certified that error appears in the above-identified patent and that said Letters Patent is hereby corrected as shown below:

<u>Title page,</u>
Item [57], ABSTRACT,
Line 5, "24 $\mu$m" should read -- 2 $\mu$m --.

<u>Column 6, claim 1,</u>
Line 5, "diameter in pm" should read -- diameter in $\mu$m --.
Lines 6-7, "diameter in pm" should read -- diameter in $\mu$m --.

Signed and Sealed this

Fifteenth Day of January, 2002

Attest:

JAMES E. ROGAN
*Director of the United States Patent and Trademark Office*

*Attesting Officer*